(12) United States Patent
Volvovski et al.

(10) Patent No.: US 10,969,962 B2
(45) Date of Patent: *Apr. 6, 2021

(54) COMPACTING DATA IN A DISPERSED STORAGE NETWORK

(71) Applicant: International Business Machines Corporation, Armonk, NY (US)

(72) Inventors: Ilya Volvovski, Chicago, IL (US); Praveen Viraraghavan, Chicago, IL (US); Andrew D. Baptist, Mt. Pleasant, WI (US); Jason K. Resch, Chicago, IL (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/517,989

(22) Filed: Jul. 22, 2019

(65) Prior Publication Data

US 2020/0097182 A1 Mar. 26, 2020

Related U.S. Application Data

(63) Continuation of application No. 16/143,261, filed on Sep. 26, 2018.

(51) Int. Cl.
*G06F 3/06* (2006.01)

(52) U.S. Cl.
CPC ............ *G06F 3/0608* (2013.01); *G06F 3/067* (2013.01); *G06F 3/0643* (2013.01)

(58) Field of Classification Search
None
See application file for complete search history.

(56) References Cited

U.S. PATENT DOCUMENTS 9,747,202 B1 * 8/2017 Shaharabany ...... G06F 12/0246
9,830,098 B1 * 11/2017 Lin .................... G11C 16/10
(Continued)

FOREIGN PATENT DOCUMENTS

WO 2014163743 A1 10/2014

OTHER PUBLICATIONS

List of IBM Patents or Patent Applications Treated as Related, dated Sep. 11, 2020, 1 page.

(Continued)

*Primary Examiner* — Kevin Verbrugge
(74) *Attorney, Agent, or Firm* — James Nock; Andrew D. Wright; Roberts Calderon Safran & Cole, P.C.

(57) ABSTRACT

A method for execution by a dispersed storage and task (DST) execution unit includes generating a first compaction object by performing a compaction function on a first previously compacted object and first data slices that compare favorably to a cold access threshold. Storage of the first previously compacted object in a cold memory region is replaced with the first compacted object, and the first data slices are removed from prior storage in different memory regions. A second compacted object is generated by performing the compaction function on a second previously compacted object and second data slices that compare favorably to a hot access threshold. Storage of the second previously compacted object in a hot memory region is replaced with the second compacted object, and the second data slices are removed from prior storage in different memory regions.

20 Claims, 6 Drawing Sheets

(56) References Cited

U.S. PATENT DOCUMENTS

| 2012/0072683 | A1  | 3/2012 | Iliadis |
| 2014/0188870 | A1  | 7/2014 | Borthakur et al. |
| 2014/0189206 | A1  | 7/2014 | Sinclair et al. |
| 2016/0283129 | A1* | 9/2016 | Wang .................... G06F 3/0685 |
| 2018/0275907 | A1* | 9/2018 | Subramanian .......... G06F 3/061 |
| 2020/0097181 | A1  | 3/2020 | Volvovski |
| 2020/0097399 | A1* | 3/2020 | Lee ..................... G06F 12/0246 |

OTHER PUBLICATIONS

Notice of Allowance dated Sep. 1, 2020 issued in U.S. Appl. No. 16/143,261, 8 pages.

* cited by examiner

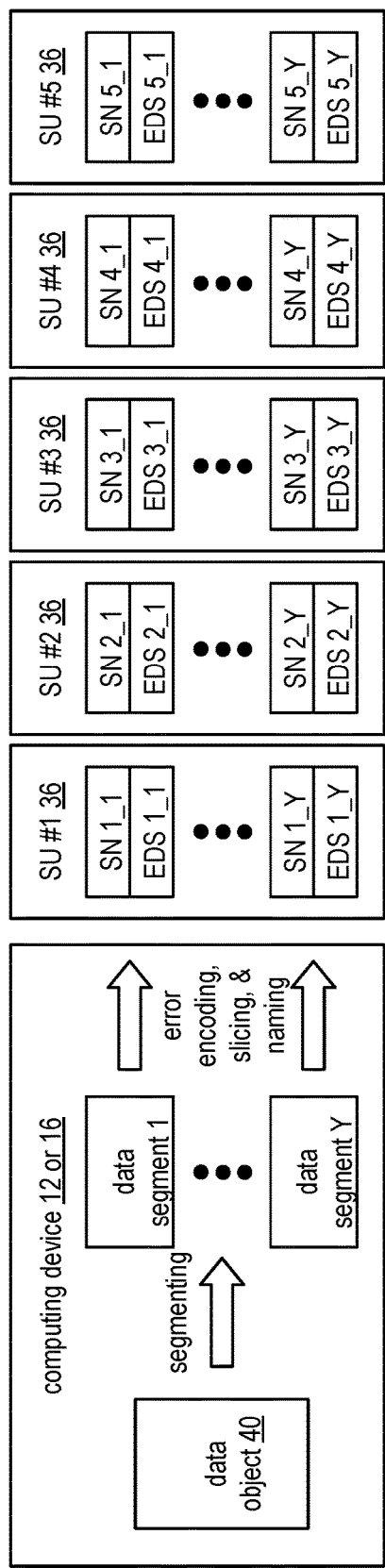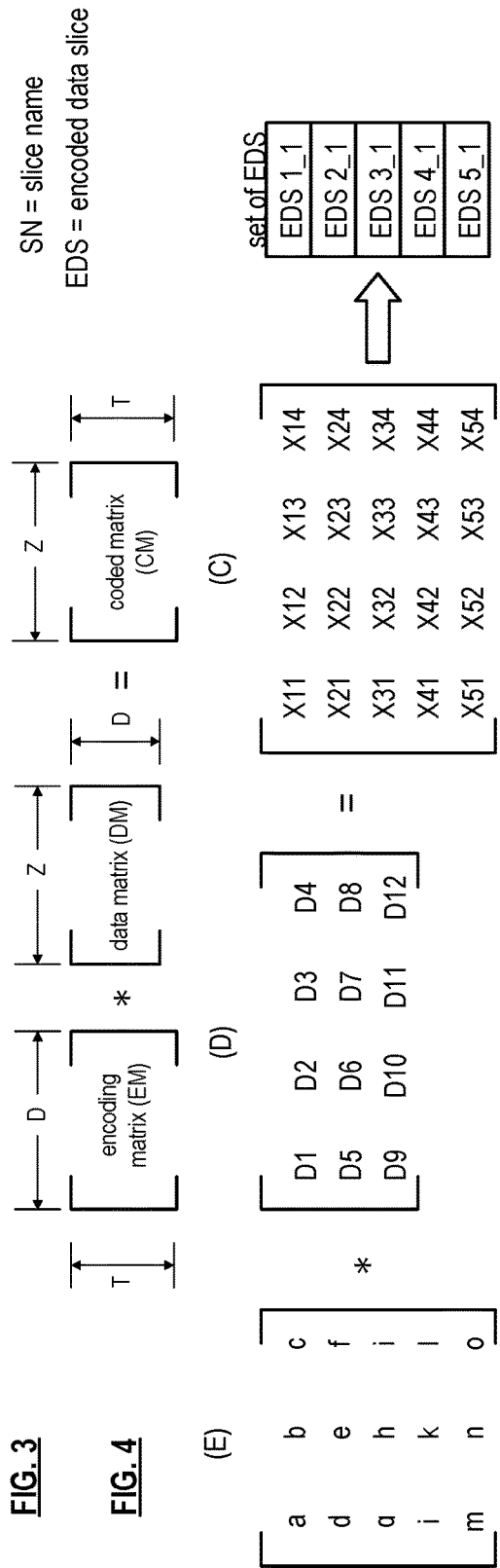

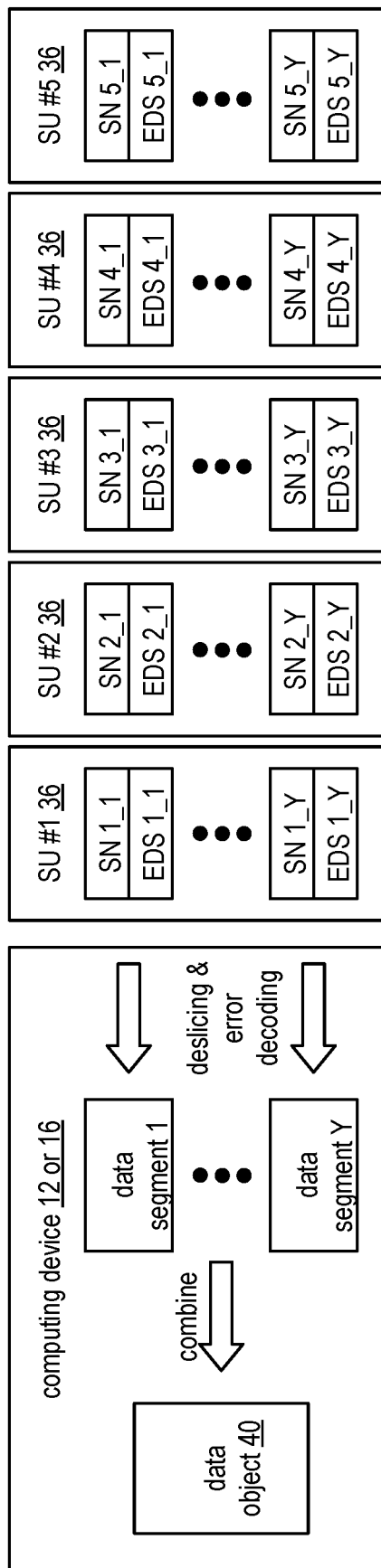

COMPACTING DATA IN A DISPERSED STORAGE NETWORK

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

FIG. 7 is a schematic block diagram of an example of dispersed storage error decoding of data in accordance with the present invention;

FIG. 8 is a schematic block diagram of a generic example of an error decoding function in accordance with the present invention;

DETAILED DESCRIPTION OF THE INVENTION

Figure 1:
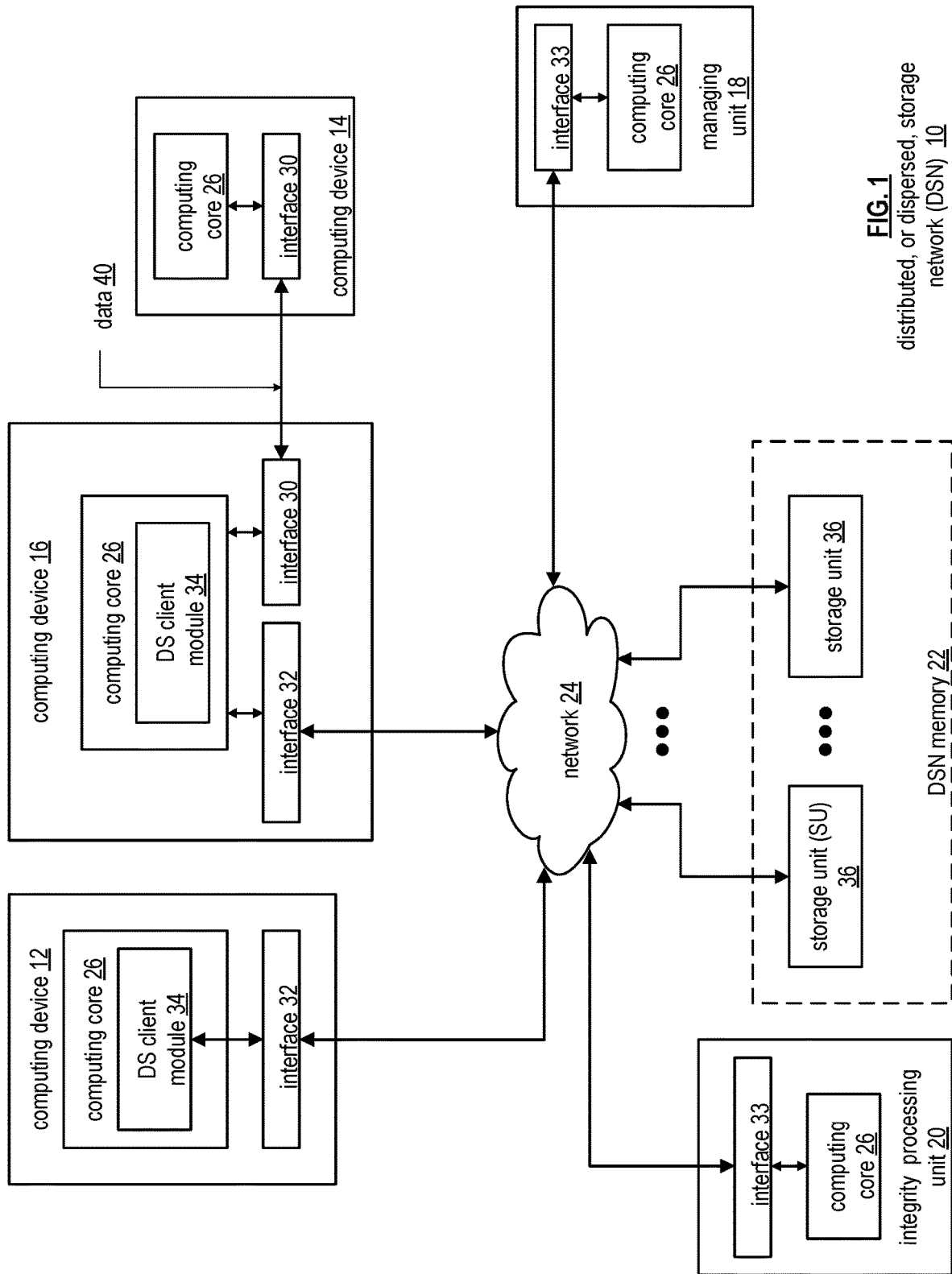
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
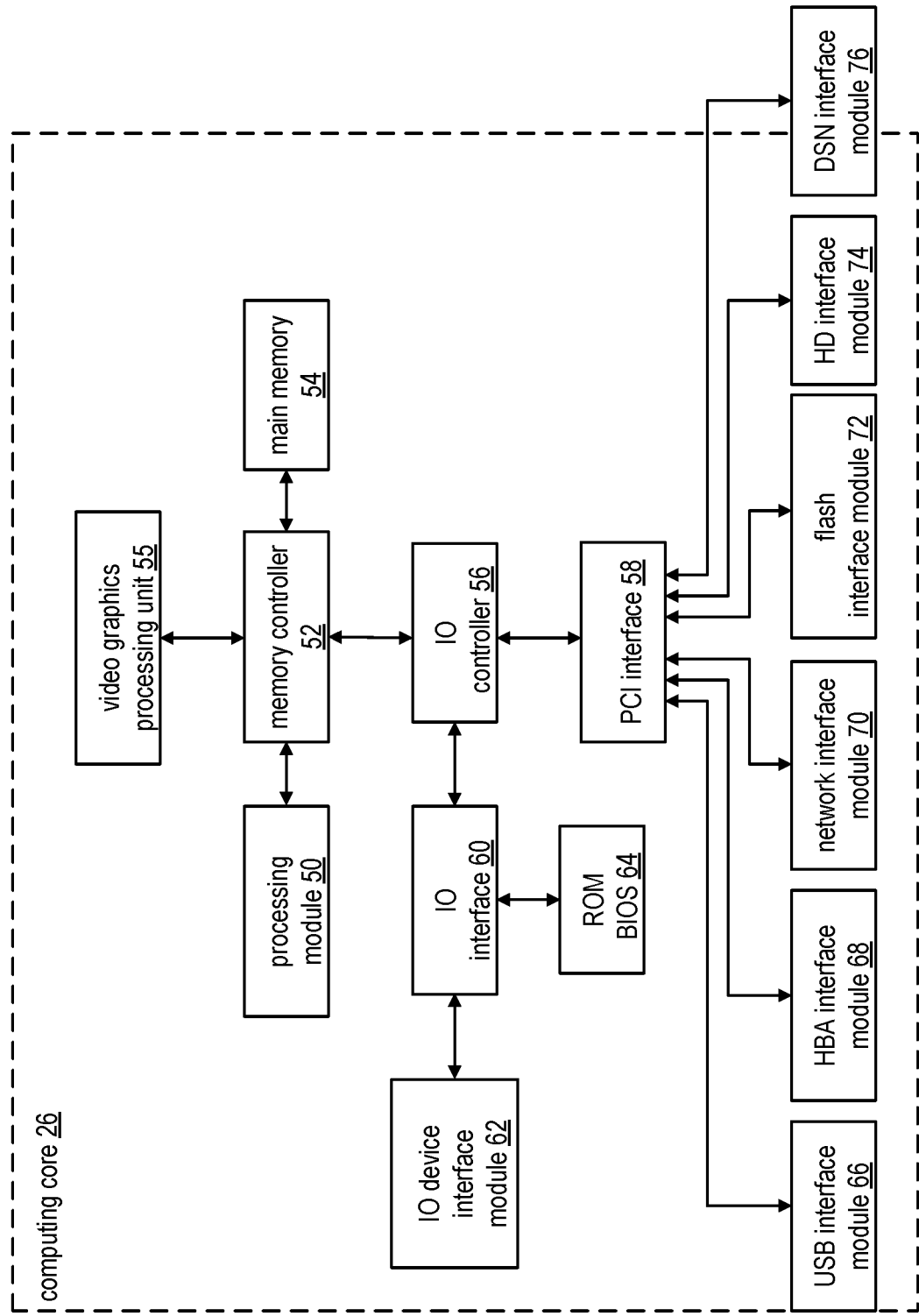
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

In various embodiments, each of the storage units operates as a distributed storage and task (DST) execution unit, and is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. Hereafter, a storage unit may be interchangeably referred to as a dispersed storage and task (DST) execution unit and a set of storage units may be interchangeably referred to as a set of DST execution units.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each managing unit 18 and the integrity processing unit 20 may be separate computing devices, may be a common computing device, and/or may be integrated into one or more of the computing devices 12-16 and/or into one or more of the storage units 36. In various embodiments, computing devices 12-16 can include user devices and/or can be utilized by a requesting entity generating access requests, which can include requests to read or write data to storage units in the DSN.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. Here, the computing device stores data object 40, which can include a file (e.g., text, video, audio, etc.), or other data arrangement. The dispersed storage error encoding parameters include an encoding function (e.g., information dispersal algorithm (IDA), Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides data object 40 into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
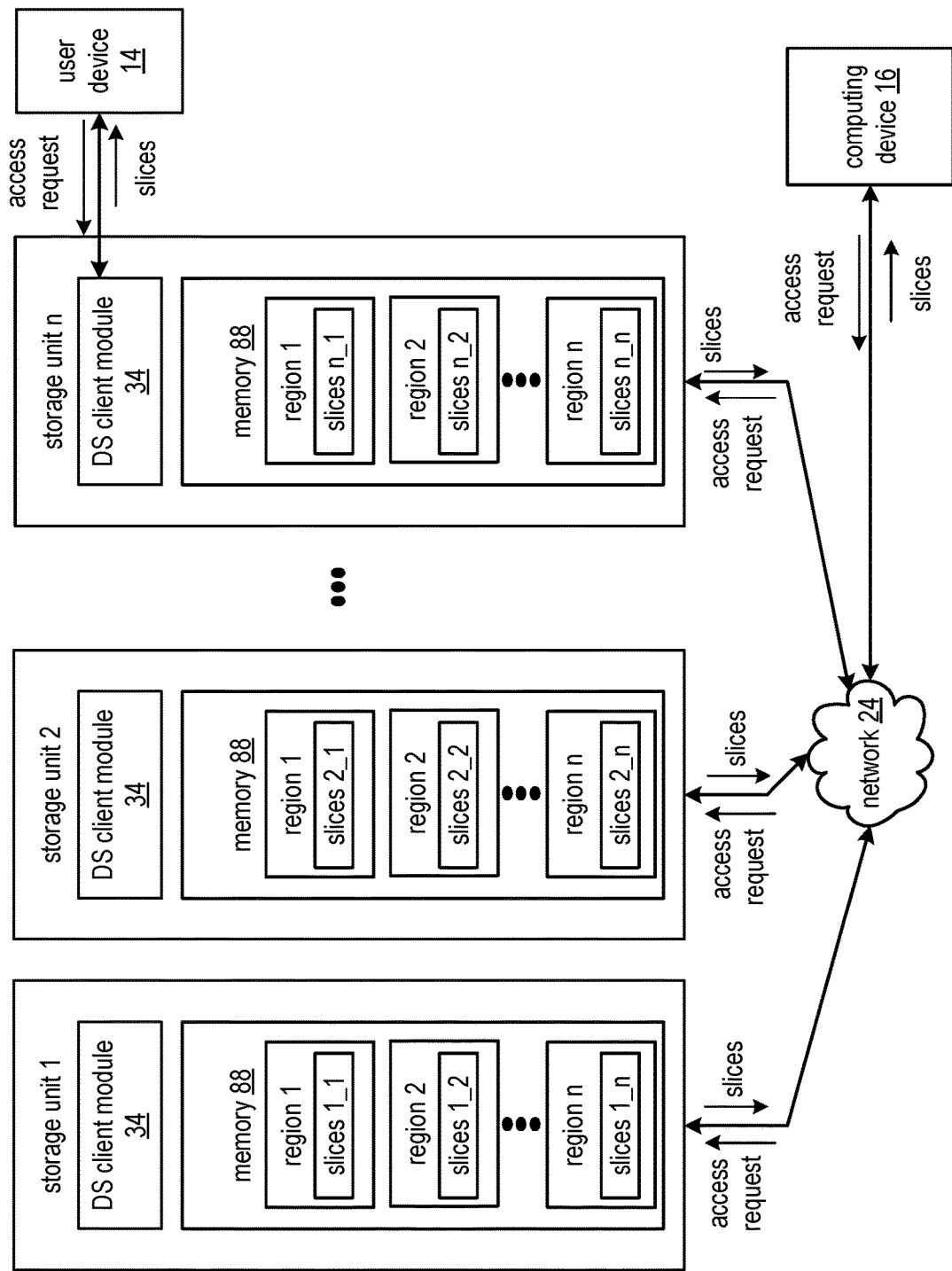
FIG. 9 is a schematic block diagram of an embodiment of a dispersed or distributed storage network (DSN) in accordance with the present invention.
Figure 10:
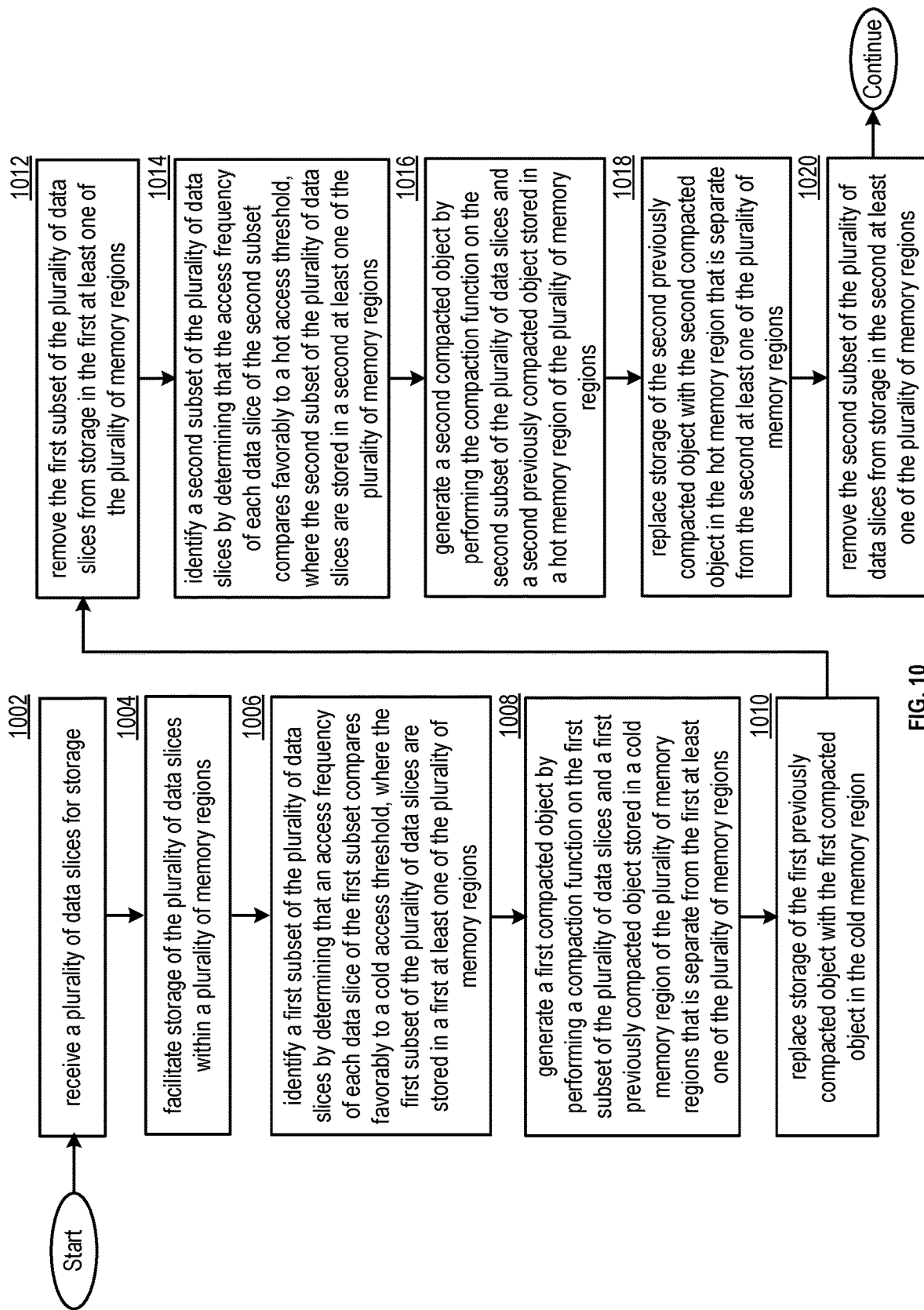
FIG. 10 is a logic diagram of an example of a method of compacting data in accordance with the present invention.

FIGS. 9 and 10 illustrate an embodiment that utilizes compaction routines to co-locate data based on access frequency to increase storage efficiency and performance. Often, there are two types of data that are being written to a storage unit: the write once object with no modifications, and an object that is being modified at a more regular cadence. Utilizing compaction can allow for the re-use of space on a storage unit after data slices have been invalidated. In this case, the co-located valid data slices can be moved to a new region and the old region is marked available for use by any new writes. The move to a new region can include intelligently placing the data in an area marked for cold data. For example, the compacted data can be placed on slower areas of the storage device or can be moved to a slower storage device (e.g. Hard drive device moving to tape device). The combining of data based on longevity can create two areas on the storage device. The number of compactions that the data in the cold area has survived can be tracked as an aging metric. The aging metric can be another tool to help determine the level of co-location and/or segregation that can be achieved. By offloading the cold data to another tier such as a tape device, the faster hard drive that previously stored this cold data can be made available for more active data. This movement can also improve efficiency because the cold data is stored on a more cost effective device. Similar compaction techniques can be utilized to also place highly modified data together in high performance areas of the storage device (e.g. such as the outer diameter of a hard drive) or on a faster storage device. In response to determining that this compacted data is always being modified, it can be moved to a solid state memory device to achieve the performance gains of that device for these heavily modified data slices. Also, as these areas will likely require frequent compactions, efficiency can improve because compaction can be performed over the whole region with only a small percent of the data slices surviving the action.

FIG. 9 is a schematic block diagram of another embodiment of a dispersed storage network (DSN) that includes the network 24 of FIG. 1 and a plurality of storage units 1-*n*. Some or all of the plurality of storage units can be implemented by utilizing the storage unit 36 of FIG. 1. Each of the plurality of storage units can be implemented as a DST execution unit, and can include at least one DS client module 34 of FIG. 1 and a memory 88. Memory 88 can be implemented by one or more memory devices. Each DS client module 34 can be implemented by utilizing one or more processing devices.

The DSN can further include the user device 14 and/or computing device 16 of FIG. 1, operable to send access requests to the storage units via network 24. The access requests can include data slices to be written to storage, read requests, and/or task requests. The user device 14 and/or computing device 16 can receive data slices stored by the storage units in response. One or more computing devices 16 and/or user devices 14 can generate the data slices for storage by performing a dispersed storage error encoding function on a set of data segments for storage, where the encoded data slices of a data segment are transmitted to an information dispersal algorithm (IDA) width threshold number of storage units. One or more computing devices 16 and/or user devices 14 can recover a data segment by retrieving at least an IDA decode threshold number of encoded data slices from at least a corresponding IDA decode threshold number of storage units, and by performing a dispersed storage error decoding function on the received encoded data slices.

Each memory 88 can include a plurality of memory regions 1-*n*, and each storage unit can include the same or different number of memory regions. Each memory region can correspond to regions of the same or different memory devices of memory 88. Some or all memory regions can include a subset of consecutive memory addresses or other consecutive set of memory of a memory device. A memory device can include part of one memory region, and entire memory region, or multiple memory regions designated by their own separate consecutive subsets of memory addresses. Some or all of the memory regions of a storage unit can be implemented by utilizing different types of memory devices which can include a tape device, hard drive device, a solid state memory device, and/or another type of memory device. Some or all of the memory regions of a storage unit can be managed by the DS client module 34 or other processing system of the storage unit directly, where the DS client module 34 is operable to select memory regions in which to store slices, to determine when to migrate slices to a different memory region and/or to facilitate migration of slices to a different memory region. Such storage and migration can be managed by the DS client module internally within the corresponding storage unit, with or without instruction from computing device 16 and/or user device 14, and with or without utilizing network 24. In some embodiments, some or all memory regions can have their own designated DS client module or other processing system, operable to communicate with other DS client modules of other memory regions within the same storage unit and/or operable to communicate with a master DS client module of the storage device, for example, in conjunction with the migration of data slices between memory regions. In such embodiments, the DS client module of a memory region can manage the storage of data slices within the memory region.

Each memory region can store a subset of a plurality of data slices stored by storage unit. These subsets of data slices can be mutually exclusive and/or collectively exhaustive. Some or all of the memory regions can be designated for storage of data slices based on their corresponding access frequency. As used herein, access frequency of a data slice can indicate a number of times the data slice has been accessed within a predetermined time frame, a total number of times the data slice has been accessed, a window of time since the most recent access of the data slice, a predicted frequency of access in a future time frame based on previous access frequency or information received via the network, and/or other information. In some embodiments, these accesses correspond only to changes and/or modifications to the data slice, where the access frequency indicates the frequency and/or recency of change and/or modification to the data slice. Alternatively, these access can also correspond to any access such as reads on the data slice or tasks performed on the data slice, even if the data slice remains unaltered, where the access frequency indicates the frequency and/or recency of all access of the data slice. As used herein, a higher access frequency can indicate the data slice has been or is expected to be accessed more frequently than a data slice with a lower access frequency, can indicate a shorter amount of time since the most recent access than a data slice with a lower access frequency, and/or can indicate a higher number of total accesses than a data slice with a lower access frequency. The access frequency can be based on an assigned priority level of the data slice received via the network, based on a corresponding priority level of a computing device that generated the data slice, and or based on a corresponding priority level of a computing device that requested read access to the data slice. For example, a higher or otherwise more favorable priority level can correspond to a higher access frequency for the data slice.

Access frequency of a data slice can be tracked by the storage unit and/or stored locally in an access frequency table mapping each data slice to access frequency, can be determined locally based on timestamps of all accesses of data stored by the storage unit and/or can be determined locally based on timestamps of a set of most recent accesses of data stored by the stored by the storage. In some embodiments, a single table or access timestamp list is stored by the maintained by the DS client module. In some embodiments, access frequency of a data slice can be stored in conjunction with the data slice itself, for example, in a neighboring memory address, as part of the same block or data, and/or otherwise within the same memory region where the data slice is stored. In some embodiments, access frequency for all data slices of a memory region is stored in a table or access timestamp list maintained by the memory region, for example, by utilizing its own DS client module. In some embodiments, access frequency is not stored, and action is only taken in response to a data slice being modified or otherwise access, for example, indicating the access frequency is high.

In some embodiments, a single memory region of a storage unit, or a set of memory regions of a storage unit, are designated for the storage of data slices with lowest access frequencies and/or with access frequency that compares favorably to a cold access frequency threshold. As used herein, this single memory region or set of memory regions will be referred to as the cold memory region. Alternatively or in addition, another single memory region of a storage unit, or another set of memory regions of a storage unit, are designated for the storage of data slices with highest access frequency and/or with access frequency that compares favorably to a hot access frequency threshold. As used herein, this other single memory region or other set of memory regions will be referred to as the hot memory region.

In some embodiments, the cold memory region and/or the hot memory region can include one or more types of storage devices. The one or more types of storage devices can be associated with a performance level, for example, where a higher access speed or other favorable performance metric is associated with a higher or otherwise more favorable performance level. The hot memory region can include one or more types of storage devices with more favorable performance levels than the one or more types of storage devices of the cold memory region. In some embodiments, the cold memory region and hot memory region include distinct memory devices, for example, where the cold memory region includes a tape device and where the hot memory region includes a solid state memory device. Some or all of the cold memory region and hot memory region can be included within the same memory device, for example, where the cold memory region includes an inner diameter of a hard drive and where the hot memory region includes an outer diameter of the same hard drive. The hot memory region and cold memory region can be stored on the same or different types of memory device, for example, where both include solid state memory devices of differing performance levels, or differing performance levels of regions of memory within the same memory device.

The cold memory region and hot memory region can comprise all of the memory regions of the storage unit, where all data slices are stored within either the cold memory region or the hot memory region. In other embodiments, a set of remaining memory regions can correspond to neutral memory regions that are not designated as cold or hot, and/or can utilize memory devices with performance levels that are more favorable than the cold memory region and less favorable than the hot memory region. In some embodiments, one or more neutral memory regions can be designated for storage of new slices received by the storage unit that do not yet have a determined access frequency, and these new slices can be later migrated appropriately once an initial access frequency has been determined. In some embodiments, three or more access frequency levels can correspond to three or more memory region. For example, all of the memory regions of a memory device can correspond to an access frequency level, where storage of all data slices is quantized into one of a plurality of access frequency levels that each correspond to one of the plurality of memory regions. Thus, each data slice is assigned to storage in the memory region that corresponds to their quantized access frequency. This plurality of memory regions can include three or more memory devices corresponding to three or more quantized access frequency levels. The lowest access frequency level can correspond to the cold memory region, and the highest access frequency level can correspond to the hot memory region. The performance level of memory devices utilized by the plurality of memory regions can correspond to their respective quantized access frequency levels, where memory regions with higher quantized access frequency levels utilize higher performing memory devices than memory regions with lower quantized access frequency levels, and/or where neutral memory regions utilize memory devices associated with an average performance level.

Data slices can be migrated for storage in different regions of memory based on changes to their access frequency. For example, once access frequency of a data slice compares favorably to the cold access frequency threshold or the hot access frequency threshold, the data slice can be migrated to the cold memory region or the hot memory region, respectively. In some embodiments, the storage unit periodically checks the access frequency of some or all data slices across some or all memory regions, and redistributes some or all data slices to appropriate regions accordingly. The data slices can similarly be migrated out of the cold or hot memory region in response to their access frequency changing to compare unfavorably to the cold access frequency threshold or the hot access frequency threshold, respectively. These slices can be moved to available memory of a neutral memory device and/or can be swapped with data slices that compare favorably with the threshold. In embodiments with three or more quantized levels, data slices can be migrated between memory regions when their quantized access frequency changes from corresponding to one quantized access frequency level to a new quantized access frequency level. In some embodiments, for example where access frequency is not stored, a modification or other access to a data slice triggers automatic migration of the data slice, for example automatically to the hot memory region, to memory region corresponding to the next highest quantized access frequency level, and/or from the cold memory region to a different memory region.

The cold access frequency threshold, hot access frequency threshold, and/or bounds of some or all quantized access frequency levels can be changed dynamically in response to determining to restructure the distribution of data slices amongst the memory regions. These thresholds and quantized levels can be are lowered and/or raised based on capacity constraints, based on changes to performance of memory devices of one or more memory regions, based on adding and/or removing memory devices to the storage unit to change the number of memory regions and/or capacity of one or more individual memory regions, based on access speed requirements, and/or based on other determinations to add or remove data slices to one or more memory regions.

The set of data slices stored by each of the cold memory region, the hot memory region and/or any remaining memory regions can be compacted within the memory region. For example, a compaction function can be performed on a set of data slices stored in a memory region, which can include some or all of the data slices designated for storage in the memory region. Performing the compaction function on the set of data slices produces a compacted data object that includes the set of data slices in a compacted format. The compacted data object can correspond to the set of data slices being co-located in the memory region. The compacted data object can comprise the set of data slices consecutively stored in neighboring, consecutive memory addresses or blocks of the memory region. The compacted data object can be produced by performing a lossless compression function on the set of data slices.

The compaction function can be performed on raw data slices and/or previously compacted data objects. The compaction function can be performed in response to receiving new data slices for storage in a memory region, for example, where the data slices were migrated from a different memory region. For example, the compaction function can be performed on new data slices designated for storage in the memory region and on the previously compacted object already stored in the memory region to produce an updated compacted object that includes, in a compacted format, both the set of data slices that were already stored as the previously compacted object and the new data slices. The updated compacted object can replace the previous compacted object in storage. In some embodiments, performing the compaction function in response to receiving the new slices includes storing the new slices in neighboring, consecutive memory addresses or blocks starting at the end of the compacted object, where the updated compacted object corresponds to the consecutive data beginning at the start of the previously compacted object to the end of the new slices. In some embodiments, when new data slices are received for storage, the previously stored data slices can be extracted from the previous compacted object, and the compaction function can be performed on the extracted slices and the new slices to produce the updated compacted object. In other embodiments, once a threshold number of new data slices are received for storage, this new set of data slices can be stored separately as a different compacted object generated by performing the compaction function on only the new set of data slices, where multiple compacted objects are stored within the same memory region.

Similarly, the compaction function can be performed in response to removal of data slices in a memory region, for example, where the data slices are migrated to a different memory region. An updated compacted object can be generated that includes all of the data slices of the previous compacted object, except for the removed data slices. Performing the compaction function can include designating the portion of memory that stored the old slice as available or writing over the portion of memory that stored the old slice with the newly compacted object. Performing the compaction function can include removing the old data slice and/or shifting a block of consecutive other data slices to write over the old data slices to maintain consecutive storage of the remaining data slices.

In some embodiments, an access to a data slice corresponds to a modification. This can result in a new, modified slice corresponding to the modification and an old slice corresponding to the previous version of the data slice. The old slice is thus invalid as a result of the modification. In such embodiments, a new compaction of a compacted object can be performed in response to a modification of one of the data slices of the compacted object. The new compaction can include removing the old slice corresponding to the previous version of the data slice and replacing it with the new slice corresponding to the modification. In some embodiments, the modified slice is assigned an updated access frequency in response to this very recent access, which can result in an immediate migration of the modified slice prior to recompacting the compacted object to a different memory region such as the hot memory region. In particular, if this compacted object does not correspond to the hot memory region, generating the compacted object can include removing both the old version of the slice and the new version of the slice from the set of data slices included in the compaction, for example, after a confirmation that the new version of the slice was successfully migrated to and compacted within an updated compacted object of the hot memory region or other destination memory region. If this compacted object does correspond to the hot memory region or the newly modified data object is determined to remain within the memory region, generating the compacted object can include removing only the old version of the slice from the set of data slices included in the compaction and including new version of the slice in the set of data slices included in the compaction.

In some embodiments, different memory regions utilize one or more different compaction functions, for example, based on the type of memory devices employed by each memory region. In some embodiments, the individual access frequencies of the set of data slices can be utilized in performing the compaction function, for example, where portions of the compacted object are ordered or otherwise arranged consecutively by access frequency of individual slices. In some embodiments, the bounds of some or all memory regions are dynamic up to a certain capacity, and are designated by the size of the compacted object. Thus, some or all memory regions can include only the co-located data slices of a single compacted object.

Aging data can be maintained for compacted data objects of one or more memory regions. The aging data for one or more compacted objects of a memory region can be tracked and maintained by the master DS client module and/or by DS client module of the memory region. The aging data can include a number of compactions performed to produce the current compacted object, for example, where the number is incremented each time a compaction is performed on the previous compacted object and new data slices. The aging data can indicate an amount of time the compacted object has been stored. The aging data can indicate a size of the compacted object, for example, where the size is updated as new data slices are added or as data slices are removed to produce new compacted objects. The size can indicate a proportion of the allotted space the compacted object is utilizing, and the allotted space can be based on a capacity of the memory region. The aging data can indicate its own access frequency, based on access of any of the data slices of the compacted object. In some embodiments, this access frequency of the compacted object is utilized to determine the access frequency of the individual data slices of the compacted object, for example, where the access frequency of some or all of the data slices of the compacted object is assigned the access frequency of the compacted object. Alternatively, the access frequency of the aging data of the compacted object can be determined based on the tracked access frequency of the individual data slices included in the compacted object, for example, indicating al of the access frequencies, an average access frequency, the highest access frequency of data slices within the compacted object, and/or a lowest access frequency of data slices within the compacted object.

In some embodiments, changes to the aging data can initiate action within the memory region of action by the storage unit. This action can be initiated in response to the aging data of a memory region comparing favorably to an aging threshold. The aging threshold can be the same or different for different memory regions, and can include a threshold number of times the data has been compacted, a threshold amount of time the compacted data has been stored, and/or a threshold size of the compacted data. The action can include recompacting one or more compacted objects within the memory region and/or restructuring storage of data within the memory region. The action can include migration of a subset of slices of the compacted object out of the memory region based on their access frequency, for example, where slices that compare least favorably to the access frequency threshold or quantized access frequency level of the corresponding memory region are migrated to a different memory region. This action can include changing the access frequency threshold for the memory region, where data slices are added to and/or removed from the memory region in response. This action can include migration of an entire compacted object to another memory region of the storage unit. This action can include transmitting the compacted object for external storage via the network, and/or facilitating offloading of the compacted object onto a separate one or more memory devices that are not maintained by the storage unit. In such embodiments, the compacted format can be maintained, or the data slices can be transmitted and/or offloaded in an uncompacted format.

Consider an example where a new memory device corresponding to a new memory region is added to the storage device and/or where a new memory device becomes available for data of the storage device to be offloaded onto the new memory device. For example this new memory device can be designated for data of the storage unit based on poor performance of the storage unit, based on a need to increase capacity or to otherwise increase number of data slices managed by the storage unit, and/or in response to the aging data comparing favorably to the aging threshold. In response to this new memory device becoming available, entire compacted objects can be redistributed to different memory regions based on the respective performance level of the new memory device.

For example, if this new memory device corresponds to a highest performing memory device, such as a new solid state memory device, this can be designated as a hotter memory region. The memory stored by the hot memory region can be transferred to this hotter memory region. The hot access frequency threshold can be lowered. An entire compacted object stored by a different memory region and/or individual slices stored in neutral memory regions can be moved to the hot memory region based on the new hot access frequency threshold. The hot memory region can now correspond to a second highest quantized access frequency level, after a highest quantized access frequency level of the new hotter memory region. A compacted object stored by a memory region that is one quantized access frequency level below the quantized access frequency level of the hot memory device can be migrated to the newly available hot memory region. A chain of migrations can be initiated, where each newly available memory region is populated with a migrated compacted object from the memory region at the next highest quantized access frequency level, and so on. The migration can end at the cold memory region migrating its compacted object, or at a different endpoint memory region migrating its compacted object, where memory regions of lower quantized access frequency levels, including the cold memory region, remain unaltered. For example, this migration endpoint memory region can become available for new data slices with unknown access frequencies before they are later redistributed to other memory regions. This migration endpoint memory region can correspond to a neutral memory region, a memory region with the middle access frequency level, at a memory region corresponding to average frequency access, or at a different memory region determined for designation of new data slices.

Similarly, if this new memory device corresponds to a lowest performing memory device, such as a tape device, this can be designated as a colder memory region. The memory stored by the cold memory region can be transferred to this colder memory region. The cold access frequency threshold can be raised, and an entire compacted object stored by a different memory region and/or individual slices stored in neutral memory regions can be moved to the cold memory region in response. The cold memory region can now correspond to a second lowest quantized access frequency level, after the lowest quantized access frequency level of the colder memory region. A compacted object stored by a memory region that is one quantized access frequency level above the quantized access frequency level of the cold memory device can be migrated to the newly available cold memory region. A chain of migrations can be initiated, where each newly available memory region is populated with a migrated compacted object from the memory region at the next lowest quantized access frequency level, and so on. The migration can end at the hot memory region migrating its compacted object, or at a different endpoint memory region migrating its compacted object, where memory regions of higher quantized access frequency levels, including the hot memory region, remain unaltered. For example, this migration endpoint memory region can become available for new data slices with unknown access frequencies before they are later redistributed to other memory regions. This migration endpoint memory region can correspond to a neutral memory region, a memory region with the middle access frequency level, at a memory region corresponding to average frequency access, or at a different memory region determined for designation of new data slices.

In some embodiments, in response to the aging data of a compacted object of the cold memory region comparing favorably to the aging threshold, the compacted object is migrated to the colder memory device. In such embodiments, this can include transmitting the compacted object via network 24 or otherwise offloading the compacted object to the colder memory device. In some embodiments, the colder memory device is not managed by the storage unit, and requests for data stored by the colder memory device are automatically routed to a different storage unit or other entity that is responsible for the colder memory device. In some embodiments, if access frequency of a data slice of the colder memory device is access at all and/or is accessed frequently enough to compare favorably to an onloading access frequency threshold, the data slice can be retrieved from the colder memory device, for example, via network 24 and/or by otherwise onloading the data slice for storage in the cold memory region maintained by the storage unit and/or in another memory region.

FIG. 10 is a flowchart illustrating an example of compacting data based on access frequency. In particular, a method is presented for use in association with one or more functions and features described in conjunction with FIGS. 1-9, for execution by a dispersed storage and task (DST) execution unit that includes a processor or via another storage unit or processing system of a dispersed storage network that includes at least one processor and memory that stores instruction that configure the processor or processors to perform the steps described below.

Step 1002 includes receiving a plurality of data slices for storage. Step 1004 includes facilitating storage of the plurality of data slices within a plurality of memory regions. Step 1006 includes identifying a first subset of the plurality of data slices by determining that an access frequency of each data slice of the first subset compares favorably to a cold access threshold, where the first subset of the plurality of data slices are stored in a first at least one of the plurality of memory regions. Step 1008 includes generating a first compacted object by performing a compaction function on the first subset of the plurality of data slices and a first previously compacted object stored in a cold memory region of the plurality of memory regions that is separate from the first at least one of the plurality of memory regions. Step 1010 includes replacing storage of the first previously compacted object with the first compacted object in the cold memory region. Step 1012 includes removing the first subset of the plurality of data slices from storage in the first at least one of the plurality of memory regions.

Step 1014 includes identifying a second subset of the plurality of data slices by determining that the access frequency of each data slice of the second subset compares favorably to a hot access threshold, where the second subset of the plurality of data slices are stored in a second at least one of the plurality of memory regions. Step 1016 includes generating a second compacted object by performing the compaction function on the second subset of the plurality of data slices and a second previously compacted object stored in a hot memory region of the plurality of memory regions. Step 1018 includes replacing storage of the second previously compacted object with the second compacted object in the hot memory region that is separate from the second at least one of the plurality of memory regions. Step 1020 includes removing the second subset of the plurality of data slices from storage in the second at least one of the plurality of memory regions.

In various embodiments, the second compacted object is stored in consecutive memory addresses of the hot memory region. In various embodiments, the cold memory region is associated with a first performance level, and the hot memory region is associated with a second performance level that is more favorable than the first performance level. In various embodiments, the cold memory region corresponds to a tape device. In various embodiments, the cold memory region corresponds to an inner diameter of a hard drive and/or the hot memory region corresponds to an outer diameter of a hard drive. In various embodiments, the hot memory region corresponds to a solid state memory device.

In various embodiments, portions of the first at least one of the plurality of memory regions are indicated to be available for new data slices in response to removing the first subset of the plurality of data slices from the portions of the first at least one of the plurality of memory regions. At least one additional data slice is received for storage. The at least one additional data slice is stored within the portions of the first at least one of the plurality of memory regions in response to the indication that the portions are available for new data slices.

In various embodiments, the storage unit stores cold compaction aging data corresponding to compacted data stored by the cold memory region. Transfer of the first compaction object to a colder memory region is facilitated in response to determining the cold compaction aging data compares favorably to a compaction aging threshold. A third subset of the plurality of data slices are identified by determining that the access frequency of each data slice of the third subset compares favorably to the cold access threshold, where the third subset of the plurality of data slices are stored in a third at least one of the plurality of memory regions that is separate from the cold memory region and the colder memory region. A third compacted object is generated by performing the compaction function on the third subset of the plurality of data slices. The third compacted object is stored in the cold memory region, and the third subset of the plurality of data slices are removed from storage in the third at least one of the plurality of memory regions. The cold compaction aging data is reset in response to storing the third compacted object in the cold memory region.

In various embodiments, the cold compaction aging data indicates a number of compactions corresponding to compacted data stored by the cold memory region. The number of compactions is incremented in response to generating the first compaction object. The number of compactions is reset to indicate a single compaction in response to storing the third compacted object in the cold memory region. In various embodiments, the cold compaction aging data indicates a size of the compacted data stored by the cold memory region, and the compaction aging threshold corresponds to a capacity of the cold memory region.

In various embodiments, the cold access threshold is updated from a previous value to a new value in response to facilitating transfer of the first compaction object to the colder memory region. The third subset of the plurality of data slices are identified in response to the access frequency of each of the third subset of the plurality of data slices comparing unfavorably to the previous value and comparing favorably to the new value. In various embodiments, a colder compaction aging data corresponding to compacted data stored by the colder memory region is set in response to the transfer of the first compaction object to the colder memory region. In various embodiments, the colder memory region corresponds to a storage device not included in the plurality of memory regions of the storage unit.

In various embodiments, the plurality of memory regions correspond to a plurality of ranked access frequency levels. The plurality of memory regions includes at least three memory regions, and the cold memory region corresponds to a lowest ranked frequent access level of the plurality of ranked access frequency levels. Transfer of compacted data stored in each of a subset of the plurality of memory regions to ones of the plurality of memory regions corresponding to an incrementally lower one of the plurality of ranked access frequency levels is facilitated in response to transferring the first compaction object to a colder memory region. The subset of the plurality of memory regions correspond to successive ones of the plurality of ranked access frequency levels. A first one of the subset of the plurality of memory regions corresponds to a second lowest one of the plurality of ranked access frequency levels. A second one of the subset of the plurality of memory regions is indicated as being available for new data slices, where one of the plurality of ranked access frequency levels corresponding to the second one of the subset of the plurality of memory regions is higher ranked than ones of the plurality of ranked access frequency levels corresponding to remaining ones of the subset of the plurality of memory regions. In various embodiments, the subset of the plurality of memory regions does not include the hot memory region.

In various embodiments, the storage unit stores access frequency data that indicates a plurality of access frequencies corresponding to the plurality of data slices. An access request indicating at least one of the plurality of data slices is received. An access indicated in the access request is performed on the at least one of the plurality of data slices. The access frequency data is updated to indicate the access performed on the at least one of the plurality of data slices.

In various embodiments, performing the access request indicates a request to modify one of the plurality of data slices stored in the cold memory region. Performing the access includes generating a modified version of the one of the plurality of data slices. The modified version of the one of the plurality of data slices is included in the second subset of the plurality of data slices to be included in the second compacted object stored in the hot memory region in response to the access frequency of the one of the plurality of data slices comparing favorably to the hot access frequency threshold as a result of updating the access frequency data to indicate modification of the one of the plurality of data slices. An invalid data slice corresponding to the one of the plurality of data slices before the modification is identified in a current compacted object stored in the cold memory region. The compaction function is performed on a subset of data slices of the current compacted object to generate an updated compacted object. The subset of data slices of the current compacted object includes all data slices of the current compacted object except for the invalid data slice. Storage of the current compacted object is replaced with the updated compacted object in the cold memory region.

In various embodiments, performing the access request indicates a request to modify one of the plurality of data slices stored in the hot memory region. Performing the access includes generating a modified version of the one of the plurality of data slices. An invalid data slice corresponding to the one of the plurality of data slices before the modification is identified in a current compacted object stored in the hot memory region. The compaction function is performed on the modified version of the one of the plurality of data slices and a subset of data slices of the current compacted object to generate an updated compacted object. The subset of data slices of the current compacted object includes all data slices of the current compacted object except for the invalid data slice. Storage of the current compacted object is replaced with the updated compacted object in the hot memory region.

In various embodiments, a plurality of data segments were dispersed storage error encoded to produce a plurality of sets of encoded data slices. The plurality of data slices includes at least one encoded data slice of at least one of the plurality of sets of encoded data slices designated for the DST execution unit.

In various embodiments, a non-transitory computer readable storage medium includes at least one memory section that stores operational instructions that, when executed by a processing system of a dispersed storage network (DSN) that includes a processor and a memory, causes the processing system to receive a plurality of data slices for storage. Storage of the plurality of data slices within a plurality of memory regions is facilitated. A first subset of the plurality of data slices is identified by determining that an access frequency of each data slice of the first subset compares favorably to a cold access threshold, where the first subset of the plurality of data slices are stored in a first at least one of the plurality of memory regions. A first compacted object is generated by performing a compaction function on the first subset of the plurality of data slices and a first previously compacted object stored in a cold memory region of the plurality of memory regions that is separate from the first at least one of the plurality of memory regions. Storage of the first previously compacted object is replaced with the first compacted object in the cold memory region. The first subset of the plurality of data slices is removed from storage in the first at least one of the plurality of memory regions. A second subset of the plurality of data slices is identified by determining that the access frequency of each data slice of the second subset compares favorably to a hot access threshold, where the second subset of the plurality of data slices are stored in a second at least one of the plurality of memory regions. A second compacted object is generated by performing the compaction function on the second subset of the plurality of data slices and a second previously compacted object stored in a hot memory region of the plurality of memory regions. Storage of the second previously compacted object is replaced with the second compacted object in the hot memory region that is separate from the second at least one of the plurality of memory regions. The second subset of the plurality of data slices is removed from storage in the second at least one of the plurality of memory regions.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%).

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing system", "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing system, and/or processing unit may be, or further include, memory and/or an integrated memory element, which may be a single memory device, a plurality of memory devices, and/or embedded circuitry of another processing module, module, processing circuit, processing system, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing system, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing system, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing system, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a storage unit that includes a processor, the method comprises:
   facilitating storage of a plurality of data slices within a plurality of memory regions;
   identifying a first subset of the plurality of data slices by determining that an access frequency of each data slice of the first subset compares favorably to a cold access threshold, wherein the first subset of the plurality of data slices are stored in a first at least one of the plurality of memory regions;
   generating a first compacted object by performing a compaction function on the first subset of the plurality of data slices and a first previously compacted object stored in a cold memory region of the plurality of memory regions that is separate from the first at least one of the plurality of memory regions;
   replacing storage of the first previously compacted object with the first compacted object in the cold memory region;
   removing the first subset of the plurality of data slices from storage in the first at least one of the plurality of memory regions;
   identifying a second subset of the plurality of data slices by determining that the access frequency of each data slice of the second subset compares favorably to a hot access threshold, wherein the second subset of the plurality of data slices are stored in a second at least one of the plurality of memory regions;
   generating a second compacted object by performing the compaction function on the second subset of the plurality of data slices and a second previously compacted object stored in a hot memory region of the plurality of memory regions;
   replacing storage of the second previously compacted object with the second compacted object in the hot memory region that is separate from the second at least one of the plurality of memory regions; and
   removing the second subset of the plurality of data slices from storage in the second at least one of the plurality of memory regions.

2. The method of claim 1, wherein the second compacted object is stored in consecutive memory addresses of the hot memory region.

3. The method of claim 1, wherein the cold memory region is associated with a first performance level, and wherein the hot memory region is associated with a second performance level that is more favorable than the first performance level.

4. The method of claim 1, further comprising:
   indicating that portions of the first at least one of the plurality of memory regions are available for new data slices in response to removing the first subset of the plurality of data slices from the portions of the first at least one of the plurality of memory regions;
   receiving at least one additional data slice for storage; and
   storing the at least one additional data slice within the portions of the first at least one of the plurality of memory regions in response to the indication that the portions are available for new data slices.

5. The method of claim 1, wherein the cold memory region corresponds to a tape device.

6. The method of claim 1, wherein the hot memory region corresponds to an outer diameter of a hard drive.

7. The method of claim 1, wherein the storage unit stores cold compaction aging data corresponding to compacted data stored by the cold memory region, further comprising:
   facilitating transfer of the first compaction object to a colder memory region in response to determining the cold compaction aging data compares favorably to a compaction aging threshold;
   identifying a third subset of the plurality of data slices by determining that the access frequency of each data slice of the third subset compares favorably to the cold access threshold, wherein the third subset of the plurality of data slices are stored in a third at least one of the plurality of memory regions that is separate from the cold memory region and the colder memory region;
   generating a third compacted object by performing the compaction function on the third subset of the plurality of data slices;
   storing the third compacted object in the cold memory region;
   removing the third subset of the plurality of data slices from storage in the third at least one of the plurality of memory regions; and
   resetting the cold compaction aging data in response to storing the third compacted object in the cold memory region.

8. The method of claim 7, wherein the cold compaction aging data indicates a number of compactions corresponding to compacted data stored by the cold memory region, further comprising:
   incrementing the number of compactions in response to generating the first compaction object; and
   resetting the number of compactions to indicate a single compaction in response to storing the third compacted object in the cold memory region.

9. The method of claim 7, wherein the cold compaction aging data indicates a size of the compacted data stored by the cold memory region, and wherein the compaction aging threshold corresponds to a capacity of the cold memory region.

10. The method of claim 7, further comprising updating the cold access threshold from a previous value to a new value in response to facilitating transfer of the first compaction object to the colder memory region, wherein the third subset of the plurality of data slices are identified in response to the access frequency of each of the third subset of the plurality of data slices comparing unfavorably to the previous value and comparing favorably to the new value.

11. The method of claim 7, further comprising setting a colder compaction aging data corresponding to compacted data stored by the colder memory region in response to the transfer of the first compaction object to the colder memory region.

12. The method of claim 7, wherein the colder memory region corresponds to a storage device not included in the plurality of memory regions of the storage unit.

13. The method of claim 7, wherein the plurality of memory regions correspond to a plurality of ranked access frequency levels, wherein the plurality of memory regions includes at least three memory regions, and wherein the cold memory region corresponds to a lowest ranked frequent access level of the plurality of ranked access frequency levels, further comprising:
   facilitating transfer of compacted data stored in each of a subset of the plurality of memory regions to ones of the plurality of memory regions corresponding to an incrementally lower one of the plurality of ranked access frequency levels in response to transferring the first compaction object to a colder memory region, wherein the subset of the plurality of memory regions correspond to successive ones of the plurality of ranked access frequency levels, and wherein a first one of the subset of the plurality of memory regions corresponds to a second lowest one of the plurality of ranked access frequency levels; and
   indicating that a second one of the subset of the plurality of memory regions is available for new data slices, wherein one of the plurality of ranked access frequency levels corresponding to the second one of the subset of the plurality of memory regions is higher ranked than ones of the plurality of ranked access frequency levels corresponding to remaining ones of the subset of the plurality of memory regions.

14. The method of claim 13, wherein the subset of the plurality of memory regions does not include the hot memory region.

15. The method of claim 1, wherein the storage unit stores access frequency data that indicates a plurality of access frequencies corresponding to the plurality of data slices, further comprising:
   receiving an access request indicating at least one of the plurality of data slices;
   performing an access indicated in the access request on the at least one of the plurality of data slices; and
   updating the access frequency data to indicate the access performed on the at least one of the plurality of data slices.

16. The method of claim 15, wherein performing the access request indicates a request to modify one of the plurality of data slices stored in the cold memory region, wherein performing the access includes generating a modified version of the one of the plurality of data slices, wherein the modified version of the one of the plurality of data slices is included in the second subset of the plurality of data slices to be included in the second compacted object stored in the hot memory region in response to the access frequency of the one of the plurality of data slices comparing favorably to the hot access threshold as a result of updating the access frequency data to indicate modification of the one of the plurality of data slices, further comprising:
   identifying an invalid data slice corresponding to the one of the plurality of data slices before the modification in a current compacted object stored in the cold memory region;
   performing the compaction function on a subset of data slices of the current compacted object to generate an updated compacted object, wherein the subset of data slices of the current compacted object includes all data slices of the current compacted object except for the invalid data slice; and
   replacing storage of the current compacted object with the updated compacted object in the cold memory region.

17. The method of claim 15, wherein performing the access request indicates a request to modify one of the plurality of data slices stored in the hot memory region, wherein performing the access includes generating a modified version of the one of the plurality of data slices, further comprising:
   identifying an invalid data slice corresponding to the one of the plurality of data slices before the modification in a current compacted object stored in the hot memory region;
   performing the compaction function on the modified version of the one of the plurality of data slices and a subset of data slices of the current compacted object to generate an updated compacted object, wherein the subset of data slices of the current compacted object includes all data slices of the current compacted object except for the invalid data slice; and
   replacing storage of the current compacted object with the updated compacted object in the hot memory region.

18. The method of claim 1, wherein a plurality of data segments were dispersed storage error encoded to produce a plurality of sets of encoded data slices, and wherein the plurality of data slices includes at least one encoded data slice of at least one of the plurality of sets of encoded data slices designated for the DST execution unit.

19. A processing system of a dispersed storage and task (DST) execution unit comprises:
   at least one processor;
   a memory that stores operational instructions, that when executed by the at least one processor cause the processing system to:
   facilitate storage of a plurality of data slices within a plurality of memory regions;
   identify a first subset of the plurality of data slices by determining that an access frequency of each data slice of the first subset compares favorably to a cold access threshold, wherein the first subset of the plurality of data slices are stored in a first at least one of the plurality of memory regions;
   generate a first compacted object by performing a compaction function on the first subset of the plurality of data slices and a first previously compacted object stored in a cold memory region of the plurality of memory regions that is separate from the first at least one of the plurality of memory regions;
   replace storage of the first previously compacted object with the first compacted object in the cold memory region;
   remove the first subset of the plurality of data slices from storage in the first at least one of the plurality of memory regions;
   identify a second subset of the plurality of data slices by determining that the access frequency of each data slice of the second subset compares favorably to a hot access threshold, wherein the second subset of the plurality of data slices are stored in a second at least one of the plurality of memory regions;

generate a second compacted object by performing the compaction function on the second subset of the plurality of data slices and a second previously compacted object stored in a hot memory region of the plurality of memory regions;

replace storage of the second previously compacted object with the second compacted object in the hot memory region that is separate from the second at least one of the plurality of memory regions; and remove the second subset of the plurality of data slices from storage in the second at least one of the plurality of memory regions.

20. A computer readable storage medium comprises:

at least one memory section that stores operational instructions that, when executed by a processing system of a dispersed storage network (DSN) that includes a processor and a memory, causes the processing system to:

facilitate storage of a plurality of data slices within a plurality of memory regions;

identify a first subset of the plurality of data slices by determining that an access frequency of each data slice of the first subset compares favorably to a cold access threshold, wherein the first subset of the plurality of data slices are stored in a first at least one of the plurality of memory regions;

generate a first compacted object by performing a compaction function on the first subset of the plurality of data slices and a first previously compacted object stored in a cold memory region of the plurality of memory regions that is separate from the first at least one of the plurality of memory regions;

replace storage of the first previously compacted object with the first compacted object in the cold memory region;

remove the first subset of the plurality of data slices from storage in the first at least one of the plurality of memory regions;

identify a second subset of the plurality of data slices by determining that the access frequency of each data slice of the second subset compares favorably to a hot access threshold, wherein the second subset of the plurality of data slices are stored in a second at least one of the plurality of memory regions;

generate a second compacted object by performing the compaction function on the second subset of the plurality of data slices and a second previously compacted object stored in a hot memory region of the plurality of memory regions;

replace storage of the second previously compacted object with the second compacted object in the hot memory region that is separate from the second at least one of the plurality of memory regions; and remove the second subset of the plurality of data slices from storage in the second at least one of the plurality of memory regions.

* * * * *